March 18, 1930. C. P. NOURSE 1,751,353
JOINTED CLIP
Filed May 19, 1927
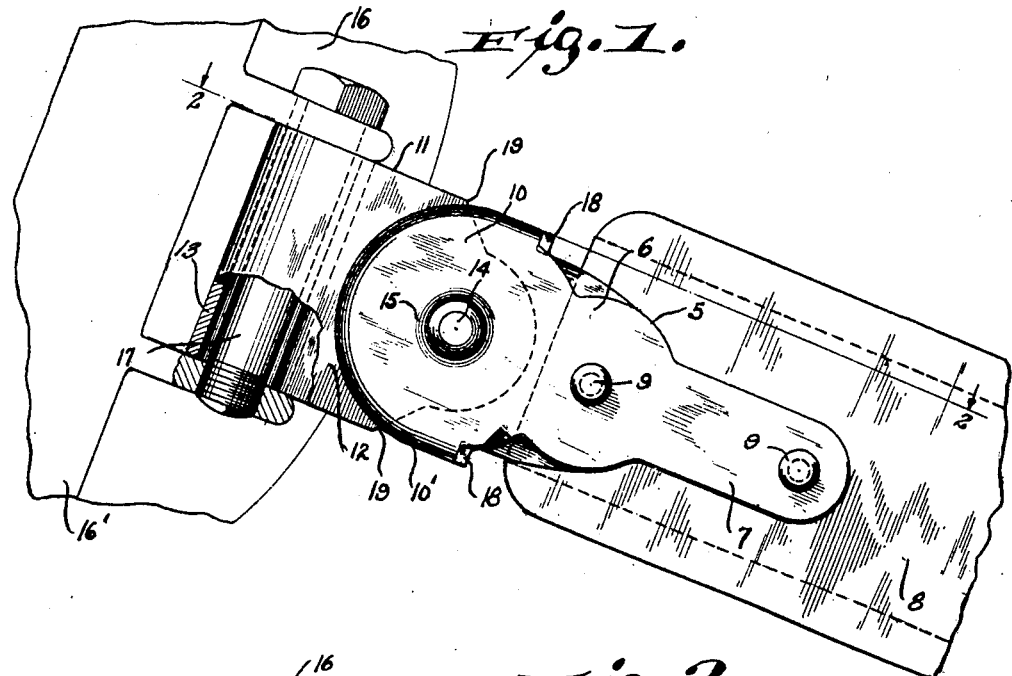
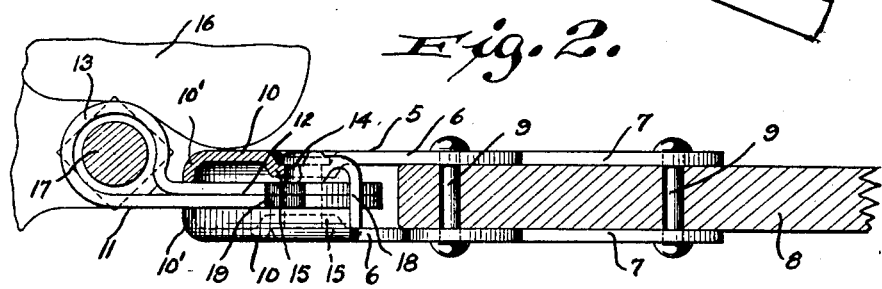
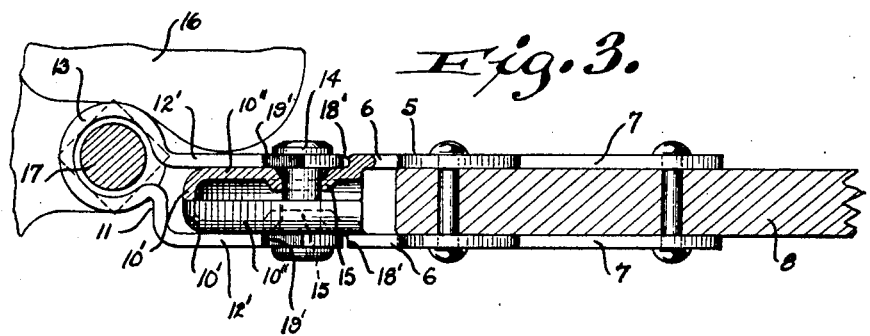
INVENTOR.
Clair P. Nourse
BY
Morrell, Keeney & Morrell
ATTORNEYS.

Patented Mar. 18, 1930

1,751,353

UNITED STATES PATENT OFFICE

CLAIR P. NOURSE, OF MILWAUKEE, WISCONSIN, ASSIGNOR TO THE MIDLAND COMPANY, OF SOUTH MILWAUKEE, WISCONSIN, A CORPORATION OF WISCONSIN

JOINTED CLIP

Application filed May 19, 1927. Serial No. 192,706.

This invention relates to improvements in jointed clips.

Jointed clips are used for the purpose of connecting the trace of a harness to a hame to permit vertical and lateral pivotal movements, but have heretofore been constructed of three members movably secured together and due to the shape and construction of the members it was necessary that at least one, and sometimes two of said members be cast.

It is the primary object of the present invention to provide a jointed clip which is composed of but two pivotally connected members of such a shape and construction that they may both be stamped from sheet metal.

A further object of the invention is to provide a jointed clip which will permit swiveling and pivotal movements and in which the members are provided with simple and effective stop means for limiting the movement of one member with respect to the other, thus preventing unnecessary extreme movements in which one part might become bound or stuck and be thereby prevented from returning to normal position.

A further object of the invention is to provide a jointed clip which is of very simple construction, is inexpensive to manufacture, is strong and durable, and is well adapted for the purpose described.

With the above and other objects in view the invention consists of the improved jointed clip and its parts and combinations, as set forth in the claims, and all equivalents thereof.

In the accompanying drawing in which the same reference characters indicate the same parts in all of the views:

Fig. 1 is a side view of the improved jointed clip connected with a trace and with a hame, parts being broken away and shown in section;

Fig. 2 is a view taken approximately on the line 2—2 of Fig. 1 with the trace shown in longitudinal section; and Fig. 3 is a similar view showing a slight modified form of the invention.

Referring now more particularly to the form of clip shown in Figs. 1 and 2 of the drawing it will appear that the numeral 5 represents an inner fixed member formed of a pair of spaced-apart complementary arms 6 having inner attaching tongues 7 between which the outer end portion of a trace 8 is rigidly secured by rivets 9. The outer end portion of each arm is disc shaped, as at 10, with inwardly projecting flanged edges 10'.

Adapted to be attached to the inner fixed member 5 is a swivel member 11 which is in the form of a doubled sheet of metal providing an inner connecting tongue 12 of two thicknesses, and an outer looped portion 13 which is off-set inwardly for the purpose of accommodating the rib of a horse collar.

The connecting tongue portion of the swivel member extends between the flanged edges of the separated disc portions 10 of the arms 6 and is pivotally connected between said portions by a pivot bolt or rivet 14 extended through the central depressed parts 15 of the disc portions, said rivet 14 also extending through the tongue 12.

The swivel member 11 of the jointed clip is adapted for attachment to a hame 16' carried by a horse collar 16 of ordinary construction, the hame having a hame bolt 17, and as shown the hame bolt extends through the looped portion of the swivel member and the jointed clip is free to turn inwardly and outwardly on said bolt.

It will be noted that one of the disc portions of an arm member rearwardly of the pivot bolt 14 is provided with a pair of opposed inwardly projecting ears 18. Also, the connecting tongue 12 of the swivel member, inwardly from its inner end portion, is provided with a pair of reduced width, is provided with a pair of opposed shoulders 19. Due to this construction when the swivel member is moved a certain distance with respect to the arms and on the pivot bolt, the shoulders 19 will engage said projecting ears 18 and act as a stop to prevent further movement.

All parts of the jointed clip are stamped from sheet steel and the manufacture of the same is very simple and inexpensive. Also it is effective in use as up and down pivotal movements between the two members, as well as movement of the entire clip inwardly and outwardly on the hame bolt, are possible.

In the modified form of the invention shown in Fig. 3 the disc portions 10″ of the arms are bent or offset inwardly and the layers 12′ forming the tongue of the swivel member 11 are separated to engage the disc portions exteriorly, the pivot pin 14 being extended through all of said portions, as shown. Pivotal movement of the swivel member with respect to the fixed member is limited by means of shoulders 18′ formed at the junction of the off-set disc portions 10″ and the tongue portions 7 which engage the widened portions 19′ of the layers 12′ when the member 11 is moved a certain amount.

From the foregoing description it will be seen that the improved jointed clip is of simple and novel construction, and is well adapted for the purpose set forth.

What I claim as my invention is:

In combination, a trace engaging member having a pair of spaced apart tongues and enlarged outer end portions, one of said outer end portions being formed with opposed, inwardly projecting ears, a trace secured flatly between said tongues, a swivel member having a tongue projecting inwardly between said enlarged outer end portions of the trace engaging member and having an outer, integral inwardly off-set looped portion, a pivot stud extending centrally through the tongue of the swivel member, the tongue of said swivel member being formed with opposed shoulders for engagement with said ears, and a hame having a hame bolt, the hame bolt being extended through the looped portion of the swivel member and the swivel member being movable thereon.

In testimony whereof, I affix my signature.
CLAIR P. NOURSE.